United States Patent [19]

Umehara

[11] Patent Number: 4,819,970
[45] Date of Patent: Apr. 11, 1989

[54] THIN FLEXIBLE METAL TUBE

[75] Inventor: Kazumasa Umehara, Tagata, Japan

[73] Assignee: Usui Kokusai Sangyo Kabushiki Kaisha, Sunto, Japan

[21] Appl. No.: 103,899

[22] Filed: Oct. 2, 1987

[30] Foreign Application Priority Data

Oct. 4, 1986 [JP] Japan .................. 61-152765[U]

[51] Int. Cl.4 .................. F16L 11/14; F16L 33/26
[52] U.S. Cl. .................. 285/227; 138/121; 285/903
[58] Field of Search .......... 285/227, 228, 226, 299, 285/301, 114, 903; 138/121

[56] References Cited

U.S. PATENT DOCUMENTS

| | | | |
|---|---|---|---|
| 2,012,766 | 8/1935 | Meyer | 138/121 X |
| 2,823,702 | 2/1958 | November | 138/121 |
| 3,061,039 | 10/1962 | Peters | 285/228 |
| 3,234,969 | 2/1966 | Du Mont | 138/121 |
| 3,259,405 | 7/1966 | Heller | 285/226 |
| 3,838,713 | 10/1974 | Tubbs | 138/121 X |
| 3,847,184 | 11/1974 | God | 138/121 X |
| 4,712,642 | 12/1987 | Lalikos et al. | 138/121 X |

FOREIGN PATENT DOCUMENTS

| | | | |
|---|---|---|---|
| 725839 | 5/1932 | France | 285/228 |
| 746015 | 2/1933 | France | 138/121 |
| 893194 | 1/1944 | France | 138/121 |
| 1515641 | 3/1968 | France | 285/227 |
| 2533996 | 4/1984 | France | 138/121 |
| 2116434 | 9/1983 | United Kingdom | 138/121 |

OTHER PUBLICATIONS

Rex—Flex, Chicago Metal Hose Corporation, Dec. 23, 1940, 7 pages.

Primary Examiner—Thomas F. Callaghan
Attorney, Agent, or Firm—Anthony J. Casella; Gerald E. Hespos

[57] ABSTRACT

A thin flexible metal tube comprising two flexible bendable portions having low corrugations and a straight flexible portion having higher corrugations easy to absorb vibrations and disposed between both the bendable portions.

7 Claims, 2 Drawing Sheets

THIN FLEXIBLE METAL TUBE

BACKGROUND OF THE INVENTION

1. Field of the Invention

This invention relates to a thin flexible metal tube used, for example, at a radiator, and required to be bent in use, subjected to large vibrations under conditions of high temperature and high pressure, and required to have reliable durability.

2 Description of the Prior Art

As a conventional technique of such field, for example, a tube connecting an engine 11 and a radiator 12 includes a flexible rubber tube 13 having large flexibility to abosrb great vibrations generated by the engine and transmitted, as shown in FIG. 6.

However, the tube is so thick to satisfy the required pressure tightness, and, therefore, weighty. It must usually be bent in use, so that it is low in productivity and expensive. In addition, since it is made of rubber, it has low heat and weather resistances, so that it is likely to be deteriorated and cracked due to vibrations applied for a long time. Namely, it has the problem of durability.

It is therefore an object of this invention to provide a flexible tube which solves the problems of low productivity, durability and reliability with the conventional flexible tube.

In order to achieve the object, this invention provides a thin flexible metal tube made, for example, of stainless steel, and including a low-corrugation bendable portion and a higher-corrugation straight portion, preferably, having a successive-U- or -Ω(omega)-like cross section. Provision of the low-corrugation bendable portion in the tube serves to facilitate the bending of the tube with a small force and to increase the rigidity of the bendable portion and to transmit vibrations applied externally to the straight portion. On the other hand, provision of higher-corrugation straight portion of an successive-U- or -Ω-like cross section serves to absorb vibration transmitted externally via the bendable portion.

DETAILED DESCRIPTION OF PREFERRED EMBODIMENTS

Figure 1:
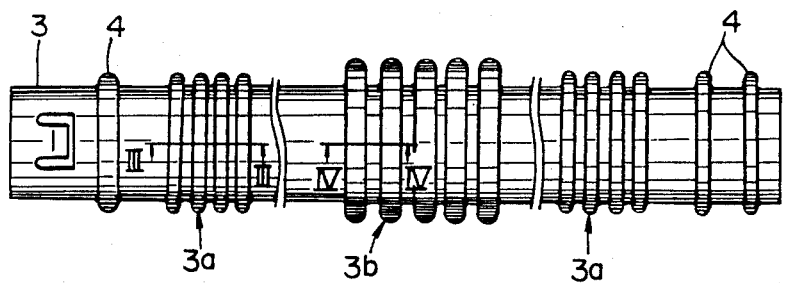
FIG. 1 is a front view of a thin flexible metal tube according to this invention.
Figure 2:
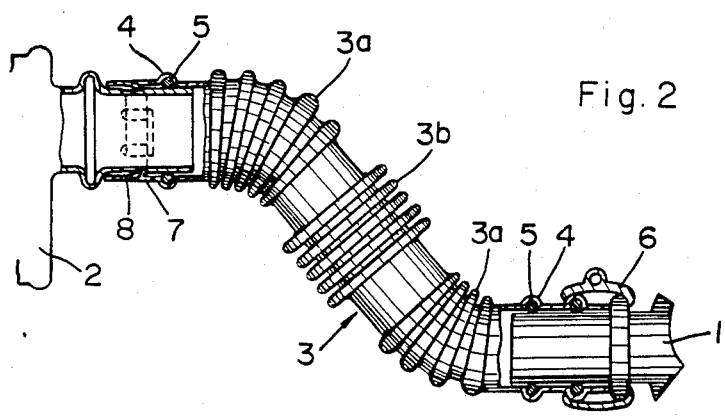
FIG. 2 is a partially cutaway cross-sectional view of a radiator tube provided in a vehicle.
Figure 3:
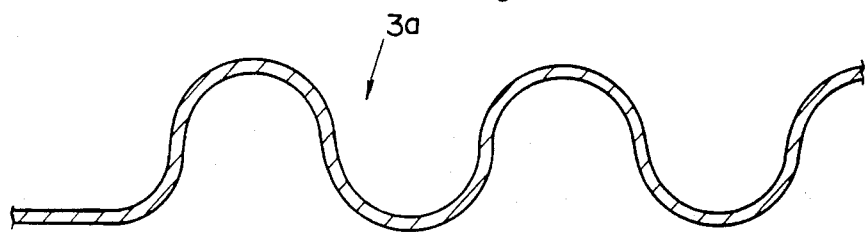
FIG. 3 is an enlarged cross-sectional view taken along the line III—III of FIG. 1.
Figure 4:
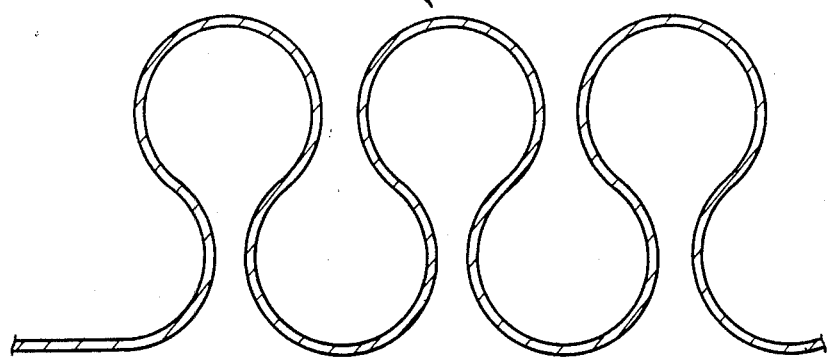
FIG. 4 is an enlarged cross-sectional view taken along the line IV—IV of FIG. 1.

In the drawings, reference numerals 1, 2 and 3 denot an engine, a radiator and a thin flexible metal tube according to this invention, respectively. The tube 3 is made, for example, of thin stainless steel of a material SUS 304, and has an outer diameter 40 mm and a thickness of 0.3 mm. For bending purposes, the stainless steel tube has two bendable flexible corrugated portions 3a, one near each of the engine 1 and radiator 2, each having a successive-U-like cross section in which the top-top diameter is 45 mm, the bottom-bottom diameter is 40 mm and the pitch is 9 mm (FIG. 3). The tube has an intermediate straight flexible corrugated portion 3b between the bendable portions 3a for absorbing vibrations. The straight portion has a successive-Ω-cross section in which the top-top diameter is 52 mm, the bottom-bottom diameter is 40 mm and the pitch is 6 mm (FIG. 4). Reference numeral 4 denotes a spool which accommodates an O-seal ring 5; 6, a slip off-preventive U-like band; 7, a draw-preventive pawl; 8, an annular groove provided on a connection branch tube of the radiator 2 for engaging the pawl 7.

By such arrangement, it is possible to bend the bendable portions 3a in a short time using an inexpensive manual bender so that the radius of curvature of the bendable portion is 40 mm (from the center of curvature to the center of the bendable portion) when the tube is disposed so as to connect the engine 1 and the radiator 2. It is unnecessary to use a power bender or the like which would be required to bend a tube without flexible portions. The bending process results in an increased tube rigidity compared to the unbent original tube, so that there is little deformation due to vibrations in the bendable portions 3a, thereby reducing stresses generated. The straight portion 3b, which has flexible higher-corrugation successive-Ω-cross section, collectively absorbs vibrations transmitted through the bendable portions 3a. The higher-corrugation successive-Ω-cross-sectional corrugation results in the scatter of stresses, thereby reducing the stresses generated, absorbing vibrations and providing highly reliable duarability.

Figure 5:
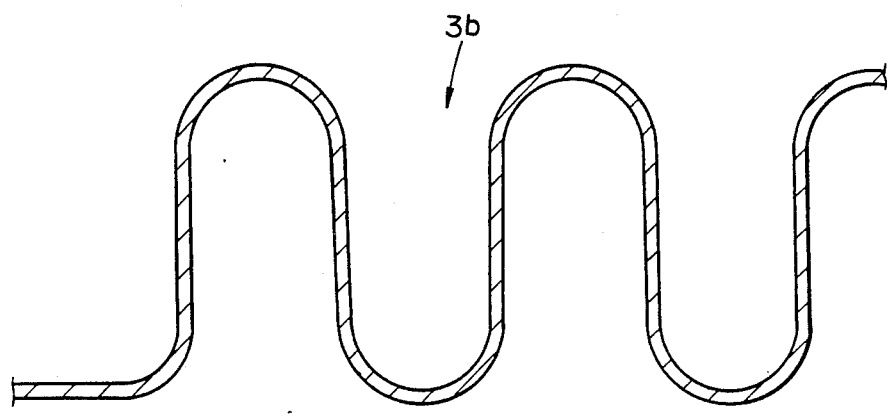
FIG. 5 is a view, similar to FIG. 4, of another embodiment.
Figure 6:
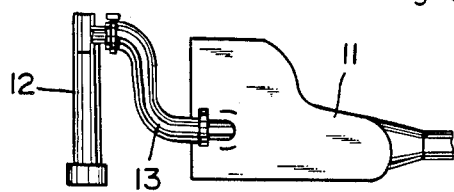
FIG. 6 is a side view of a conventional flexible rubber tube.

FIG. 5 shows another embodiment of this invention in which the flexible vibration absorbing portion 3b has a higher-corrugation successive-U-like cross section to provide an effect equal to that provided by the tube having the cross-section of FIG. 4.

The thin flexible metal tube according to this invention and a conventional flexible rubber tube were compared. The flexible rubber tube had an outer diameter of 45 mm, a thickness of 4 mm, an extended length of about 360 mm and a weight of about 250 grams while the embodiment of this invention had a weight of about 190 grams which was about 25% lighter than the conventional tube, had no cracks such as those which would be generated due to low heat and weather resistances in the conventional rubber tube and did not require large heat energy consumption and a long bending time which would be required for bending the conventional rubber tube (including the steps of winding a sheet of cloth around a bent core bar many times, and vulcanizing and shaping the resulting product).

As described above, a flexible tube provided by this invention has flexibility equal to, or higher than, the conventional rubber flexible tube, is free from fragility and hence cracks and leakage such as would be generated due to low heat and weather resistances with the conventional rubber tube, and improves its heat resistance, durability and reliability. This invention does not require any so-called rubber hose bending process which includes winding a rubber sheet and optionally a cord around a bent core bar repeatedly, applying a pressure to the resulting semi-finished product using a metal mold, keeping the semi-finished product at a high temperature for a long time, vulcanizing it, cooling it to lift the semi-finished product off the core bar (subsequently the process may require a secondary vulcanizing process depending on the kind of rubber used).

Therefore, the number of processes is greatly reduced, the processing time and energy are saved, and the tube is manufactured inexpensively.

In addition, according to this invention, the bendable portion includes a corrugated flexible portion although the corrugations are low, so that bending can be performed by a small bending force with the aid of a simple manual bender.

What is claimed is:

1. A thin flexible metal tube comprising a flexible bendable portion having a plurality of generally U-shaped corrugations defining a first height, and a straight flexible vibration absorbing portion having a plurality of generally omega-shaped corrugations defining second height, said second height being greater than the first height, whereby the portion of the tube having lower height corrugations facilitates bending of the tube, and whereby the straight portion having greater height corrugations provides enhanced absorption of vibrations transmitted externally through the bendable portion of the tube.

2. A tube of claim 1, wherein the tube is made of thin stainless steel.

3. A tube of claim 1, wherein the bendable portion comprises two spaced apart bendable portions respectively provided at opposed ends of the tube, such that the straight vibration absorbing portion is disposed intermediate the bendable portions.

4. A tube of claim 1 further comprising a noncorrugated portion intermediate said corrugated portions thereof.

5. A thin flexible metal tube comprising a pair of flexible bendable portions at spaced apart locations along said tube, each of said flexible bendable portions being defined by a plurality of generally U-shaped corrugations defining a first height, said metal tube further comprising a straight flexible vibration absorbing portion intermediate said flexible bendable portions of said tube, said straight flexible vibration absorbing portion having a plurality of generally omega-shaped corrugations defining a second height, said second height being greater than the first height, whereby the portions of the tube having the corrugations of the first height facilitate bending of the tube, and whereby the straight portion having greater height corrugations provides enhanced absorption of vibrations transmitted externally through the bendable portions.

6. A thin flexible metal tube as in claim 5 further comprising straight noncorrugated portions intermediate the straight flexible vibration absorbing portion and the respective flexible bendable portions of said tube.

7. A thin flexible metal automotive radiator tube for mounting on a vehicle having a radiator and an engine, said tube comprising a first flexible bent portion generally adjacent an end of said tube for mounting on the radiator of the vehicle, said first flexible bent portion being characterized by a plurality of generally U-shaped corrugations defining a first height, a second flexible bent portion generally adjacent the end of the tube that is mountable to the engine, said second flexible bent portion being spaced from the first flexible bent portion and being characterized by a plurality of generally U-shaped corrugations each having a height substantially equal to the first height, a straight flexible vibration absorbing portion intermediate said first end second flexible bent portions of said tube, said straight flexible vibration absorbing portion being characterized by a plurality of generally omega-shaped corrugations defining a second height, said second height being greater than the first height, whereby the bent portions of the tube are substantially rigid in their bent configurations, and whereby the straight portion of the tube having the greater height corrugations absorbs vibrations transmitted externally through the bent portions of the tube.

* * * * *